(12) United States Patent
Li et al.

(10) Patent No.: US 7,324,691 B2
(45) Date of Patent: Jan. 29, 2008

(54) SYSTEM AND METHOD FOR SHAPE RECOGNITION OF HAND-DRAWN OBJECTS

(75) Inventors: Yantao Li, Beijing (CN); Zhouchen Lin, Beijing (CN); Xun Xu, Champaign, IL (US); Jian Wang, Beijing (CN)

(73) Assignee: Microsoft Corporation, Redmond, WA (US)

(*) Notice: Subject to any disclaimer, the term of this patent is extended or adjusted under 35 U.S.C. 154(b) by 695 days.

(21) Appl. No.: 10/850,718

(22) Filed: May 20, 2004

(65) Prior Publication Data

US 2005/0063592 A1 Mar. 24, 2005

Related U.S. Application Data

(60) Provisional application No. 60/505,867, filed on Sep. 24, 2003.

(51) Int. Cl.
*G06K 9/00* (2006.01)

(52) U.S. Cl. .................... 382/181; 382/203

(58) Field of Classification Search ............... 382/181, 382/185–189, 203, 209, 218, 224, 225
See application file for complete search history.

(56) References Cited

U.S. PATENT DOCUMENTS

| | | | |
|---|---|---|---|
| 5,038,382 A | 8/1991 | Lipscomb | |
| 5,517,578 A | 5/1996 | Altman | |
| 5,544,265 A * | 8/1996 | Bozinovic et al. | 382/203 |
| 5,615,283 A | 3/1997 | Donchin | |
| 5,864,635 A | 1/1999 | Zetts | |
| 6,525,749 B1 | 2/2003 | Moran | |
| 7,136,082 B2 | 11/2006 | Saund | |
| 7,139,004 B2 | 11/2006 | Saund | |
| 2004/0090439 A1 * | 5/2004 | Dillner | 345/440 |
| 2005/0063591 A1 | 3/2005 | Chen | |
| 2005/0063594 A1 | 3/2005 | Li | |

FOREIGN PATENT DOCUMENTS

EP    1331592 A    7/2003

OTHER PUBLICATIONS

Apte, et al "Recognizing multistroke geometric shapes: an experimental evaluation", Washington University, pp. 122-128, 1993.*

(Continued)

*Primary Examiner*—Daniel Mariam
(74) *Attorney, Agent, or Firm*—Workman Nydegger

(57) ABSTRACT

A system and method for shape recognition of hand-drawn objects is provided. A shape recognizer may recognize a drawing such as a diagram or chart from ink input by recognizing closed containers and/or unclosed connectors in the drawing. The closed containers may represent any number of shapes that may be recognized including circles, ellipses, triangles, quadrilaterals, pentagons, hexagons, and so forth. The unclosed connectors may be any type of connector including lines, curves, arrows, and so forth. Polylines may be used to approximate a skeleton of a connector for handling continuation strokes, overlapping strokes and over-tracing strokes of the skeleton. By using the present invention, a user may draw diagrams and flow charts freely and without restrictions on the hand-drawn input.

45 Claims, 15 Drawing Sheets

OTHER PUBLICATIONS

Lank, et al "An interactive system for recognizing hand drawn UML diagrams", ACM, pp. 1-15, 2000.*

International Search Report in Corresponding EP Application No. EP 04019840.0-2218.

Fonseca M J et al: "Experimental evaluation of an on-line scribble recognizer" Pattern Recognition Letters, North-Holland Publ. Amsterdam, NL, vol. 22, No. 12, Oct. 2001 -10) pp. 1311-1319, XP004296516 ISSN: 0167-8655.

Kojima H et al: "Online hand-drawn line-figure recognition and its application" Proceedings of the Internationl Conference on Pattern Recognition. (ICPR). Rome, Nov. 14-17, 1988, Washingtion, IEEE Comp. Soc. Press, US, vol. vol. 2 CONF. 9, Nov. 14, 1988, pp. 1138-1142, XP010014145 ISBN: 0-81878-1.

Galindo D et al: "Perceptually-based representation of network diagrams": Proceedings of the 4$^{th}$ International Conference on Document Analysis and Recognition. (ICDAR), Los Alamitos, IEEE Comp. Soc, US, vol.vol. II, Aug. 18, 1997, pp. 352-356, XP:010244739 ISBN: 0-8186-7898-4.

Office Action mailed Jun. 13, 2007, cited in related application, U.S. Appl. No. 10/850,948.

Office Action mailed Jun. 28, 2007, cited in related application, U.S. Appl. No. 10/850,680.

Notice of Allowance mailed Aug. 10, 2007, cited in related application U.S. Appl. No. 10/850,948.

Notice of Allowance mailed Aug. 10, 2007, cited in related application U.S. Appl. No. 10/850,680.

* cited by examiner

SYSTEM AND METHOD FOR SHAPE RECOGNITION OF HAND-DRAWN OBJECTS

CROSS-REFERENCE TO RELATED APPLICATIONS

The present invention claims priority to United States provisional patent application Ser. No. 60/505,867 filed Sep. 24, 2003, and incorporated herein in its entirety.

The present invention is related to the following United States patent applications, filed concurrently herewith and incorporated herein in their entireties:

Ser. No. 10/850,948, filed on May 20, 2004 entitled, "System And Method For Detecting A Hand-Drawn Object In Ink Input" and Ser. No. 10/850,680, filed on May 20, 2004 entitled "System And Method For Detecting A List In Ink Input."

FIELD OF THE INVENTION

The invention relates generally to computer systems, and more particularly to an improved system and method for shape recognition of hand-drawn objects.

BACKGROUND OF THE INVENTION

The ability to recognize the shape of hand-drawn objects is important for users to be able to draw directly on their computers using ink input or ink notes. Current hardware and software may be able to capture ink representing handwriting reasonably well but is currently unable to similarly recognize and represent the meaning of hand-drawn objects. As a result, users instead use menu-based application programs to create drawings of objects. Various shapes may be presented by such application programs for a user to select and copy onto a drawing grid. The copied shape may then be resized to the desired scale and a user may continue to place and resize additional shapes onto the drawing grid until the drawing is complete.

Research focused on shape recognition of hand-drawn objects has yielded marginal results to date. For instance, incremental recognition algorithms have been used that may recognize simple geometric shapes such as a circle or a box from a specific number of strokes made in a particular order. However, such incremental algorithms rely on stroke order and/or assume a particular number of strokes in order to recognize a particular hand-drawn shape. Such an approach fails to be robust for several reasons. First of all, none of the incremental algorithms solves the grouping problem of deciding which collection of strokes belongs together because those strokes represent a specific shape. Without the ability to group strokes together that belong to a shape, incremental algorithms may not accommodate multi-stroke shapes such as arrows. Moreover, because incremental algorithms rely on stroke order and/or assume a particular number of strokes for a shape, the incremental algorithms are unable to solve the overtracing problem where a stroke may be overtraced during drawing of a shape.

What is needed is a way for recognizing the shape of hand-drawn objects that is insensitive to stroke input order and/or the number of strokes required to form any given shape. Any such system and method should recognize multi-stroke hand-drawn shapes and be able to decide which collection of strokes belong together that represent different shapes.

SUMMARY OF THE INVENTION

Briefly, the present invention provides a system and method for shape recognition of hand-drawn objects. To this end, a shape recognizer is provided that may recognize a drawing such as a diagram or chart from ink input. The shape recognizer may include a container recognizer for recognizing closed containers and a connector recognizer for recognizing unclosed connectors in the drawing. The container recognizer may include any number of shape classifiers including an ellipse/circle classifier, a polygon classifier, a triangle classifier, a quadrilateral classifier, and so forth. The connector recognizer may include a skeleton recognizer, an arrowhead recognizer and various other recognizers to identify the type of connector between containers in a drawing.

The present invention may recognize hand-drawn shapes by first performing container recognition for each container to identify the closed shapes, including circles, triangles, quadrilaterals, pentagons, hexagons, and so forth. One embodiment may employ a decision tree that may combine both global statistical features for identifying a shape, such as a triangle, and rule-based descriptions of specific types of that identified shape, such as distinguishing an isosceles triangle from an equilateral or right-angled triangle. In this embodiment, the global statistical features may be robust to local variations such as over-tracing and overlapping of strokes, and rule-based descriptions may provide more detailed information of shapes including several types of quadrilaterals such as a trapezoid, a parallelogram, a diamond, a rectangle, and a square.

Connector recognition may then be performed for each connector to identify the shape of the unclosed connectors, including skeletons, arrowheads and so forth. In one embodiment, polylines may be used to approximate a skeleton. In this embodiment, the present invention may handle continuation strokes of the skeleton, overlapping strokes of the skeleton and over-tracing strokes of the skeleton. After a skeleton of a connector may be recognized, an arrowhead at one or both ends of the skeleton may be recognized.

Advantageously, the system and method are insensitive to stroke input order and the number of strokes that may form a hand-drawn shape. Furthermore, the system and method may be used to recognize any closed containers and unclosed connectors in a drawing. When recognized, the type, location, orientation and size of the shape can be provided.

Other advantages will become apparent from the following detailed description when taken in conjunction with the drawings, in which:

DETAILED DESCRIPTION

Exemplary Operating Environment

Figure 1:
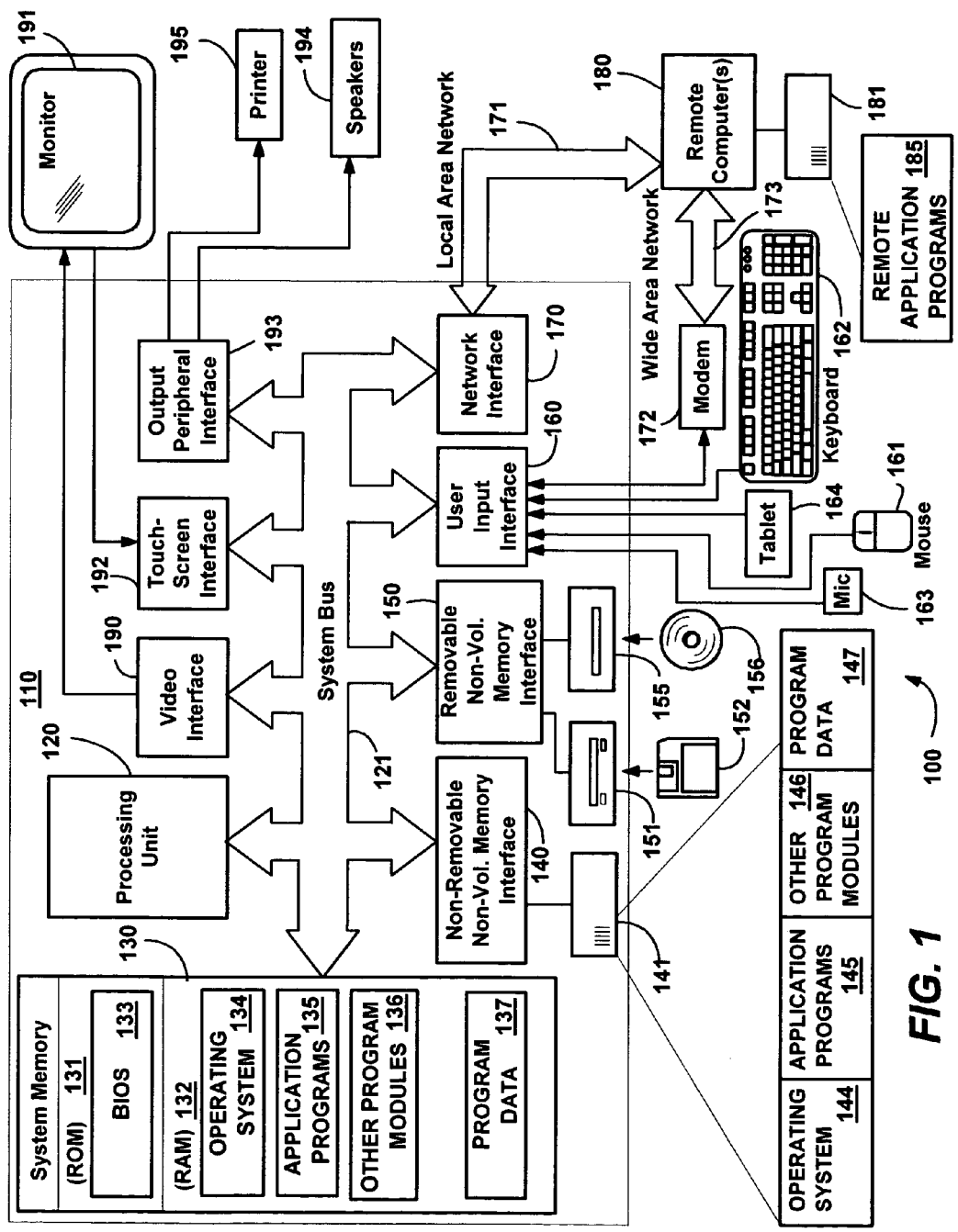
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Shape Recognition of Hand-Drawn Objects

The present invention is generally directed towards a system and method for providing shape recognition of hand-drawn objects. As used herein, hand-drawn object means any handwritten non-character shape or drawing. A user may draw diagrams and flow charts freely without restrictions on the hand-drawn input. One shape may have many strokes and the input order of strokes may be arbitrary so that the system and method may accept any ink as input. As used herein, ink generally means a handwritten stroke or strokes. Moreover, the strokes could be over-traced or overlapped. For either case, the system and method may automatically detect the correct shapes.

In specific, the system and method may recognize the hand-drawn shape of containers and connectors drawn between containers. As used herein, a container means any closed drawing object. As used herein, a connector means any drawing object joining containers. As will be understood, the various block diagrams, flow charts and scenarios described herein are only examples, and there are many other scenarios to which the present invention will apply.

Figure 2:
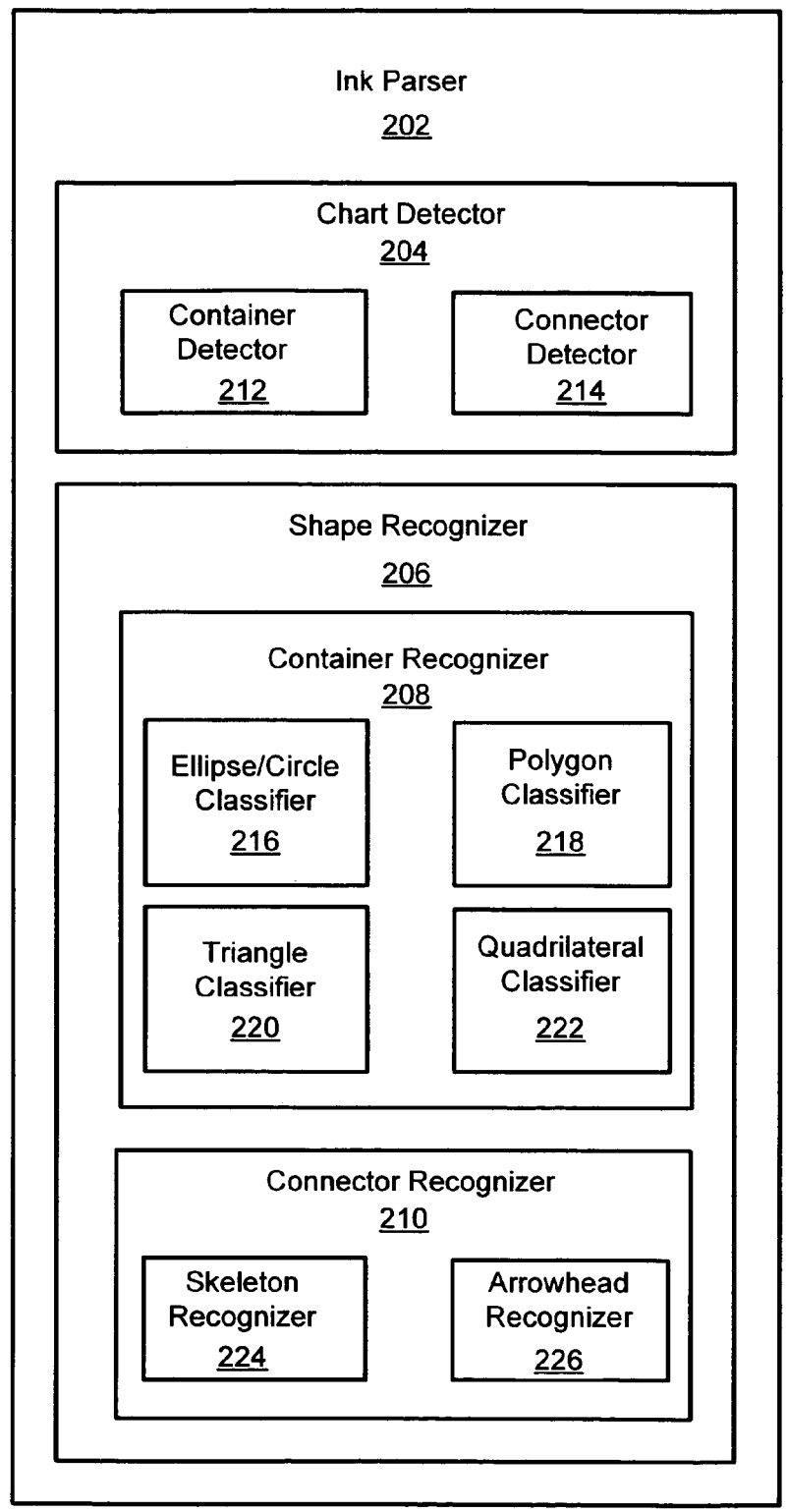
FIG. 2 is a block diagram generally representing an exemplary architecture of system components for shape recognition of hand-drawn objects, in accordance with an aspect of the present invention.

Turning to FIG. 2 of the drawings, there is shown a block diagram generally representing an exemplary architecture of system components for shape recognition of hand-drawn objects. Those skilled in the art will appreciate that the functionality implemented within the blocks illustrated in the diagram may be implemented as separate components or the functionality of several or all of the blocks may be implemented within a single component. For example, the functionality for the chart detector 204 may be included in the shape recognizer 206. Or the functionality of the container recognizer 208 may be implemented as a separate component.

The ink parser 202 may accept any ink, including ink of a drawing object. The ink parser 202 may include an operably coupled chart detector 204 and an operably coupled shape recognizer 206. In general, the chart detector 204 and the shape recognizer 206 may be any type of executable software code such as a kernel component, an application program, a linked library, an object, and so forth. The chart detector 204 may include an operably coupled container detector 212 and an operably coupled connector detector 214, and the shape recognizer 206 may include an operably coupled container recognizer 208 and an operably coupled connector recognizer 210. The container recognizer 208 may include any number of operably coupled classifiers such as an ellipse/circle classifier 216, a polygon classifier 218, a triangle classifier 220, a quadrilateral classifier 222, and so forth. The connector recognizer 210 may include any number of operably coupled recognizers such as a skeleton recognizer 224, an arrowhead recognizer 226, and so forth. Each of these components may also be any type of executable software code such as a kernel component, an application program, a linked library, an object, or other type of executable software code.

Figure 3:
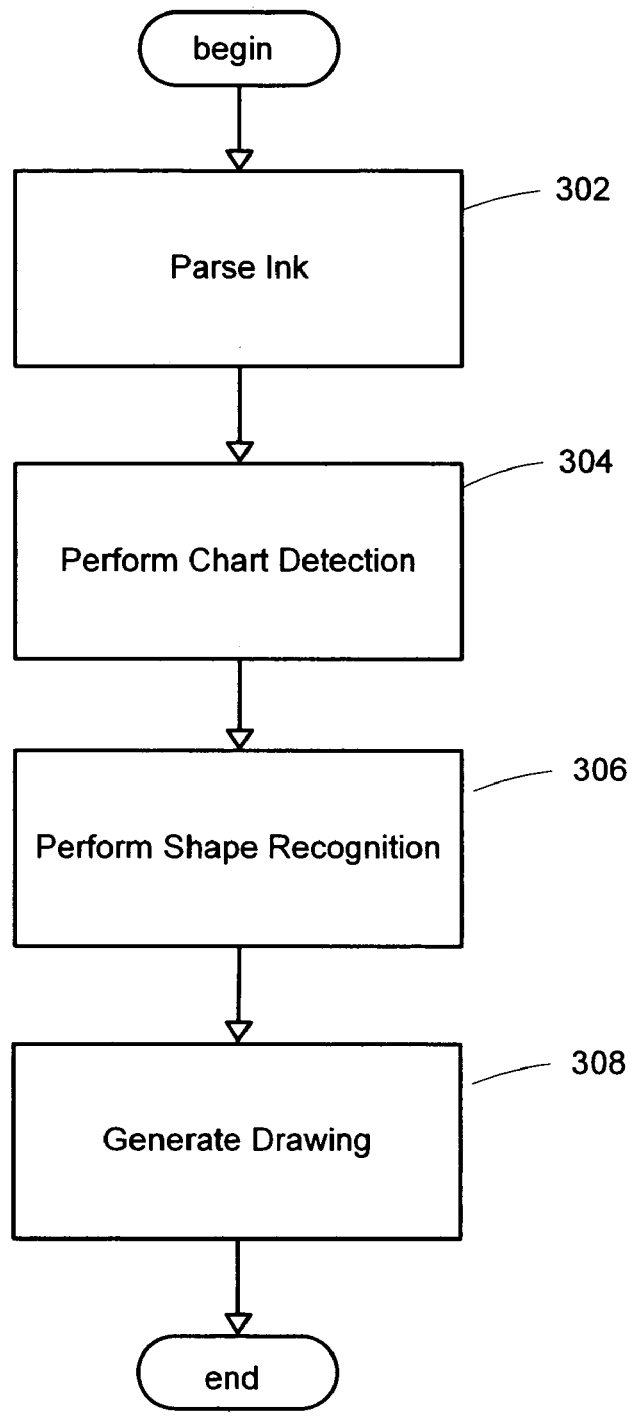
FIG. 3 is a flowchart generally representing the steps undertaken for shape recognition of hand-drawn objects, in accordance with an aspect of the present invention.

FIG. 3 presents a flowchart generally representing the steps undertaken for shape recognition of hand-drawn objects. At step 302, any ink may be parsed, including ink of a drawing object. For instance, in one embodiment, a page of ink may be accepted as input and parsed. In this embodiment, the ink parser, for example, may have no a priori knowledge of the ink on the page. Therefore, fundamental algorithms such as word grouping, writing/drawing classification and drawing grouping may be executed. In order to perform word grouping, strokes may be grouped into hierarchies of words, lines, and blocks. To do so, the word grouping process may include feature extraction of strokes to capture distance, geometric dissimilarity and linearity, and other stroke features. The word grouping process may also include dynamic programming to group the strokes according to temporal information. The word grouping process may also include clustering to group the strokes according to spatial information. The words, lines and blocks identified in the groups may not necessarily correspond to real semantic words, lines and blocks. In fact, these groups may include strokes of hand-drawn objects.

To perform writing/drawing classification, various features may be identified that may differentiate writing from drawing. For instance, single word features such as curvature, density, and other handwriting model features, may be used to differentiate writing from drawing. In one embodiment, context features such as temporal and spatial context features, may be used to differentiate writing from drawing. Each of the various features may be mapped to a fuzzy function, and classification between writing and drawing may be determined according to a combination of the fuzzy functions.

After performing word grouping and writing/drawing classification, the drawing strokes may be well organized by performing drawing grouping. To perform drawing grouping, the drawing strokes may be grouped into independent objects according to the spatial relationship among them. An efficient grid-based approach may be used for fitting the ink strokes into an image grid with an appropriate size. The image grid may be labeled to find connected components. Each connected component may correspond to a drawing object. Heuristic rules may then be applied to adjust the drawing objects.

At step 304, chart detection may be performed to group drawing strokes by finding all the strokes that may belong to a drawing object. Thus a user can draw diagrams and flow charts freely without any restriction on the input. For instance, one shape may have many strokes and the input order may be arbitrary. Moreover, the strokes could be over-traced or overlapped. For any of these cases, the system may automatically detect the correct shapes. In one embodiment, a hypergraph may be used to represent the diagrams and flow chart so that the relationship between containers and connectors may be fully represented. Thus, connectors that may join more than two containers may be supported in this embodiment.

In one embodiment, the container detector 212 may find all the strokes that belong to a container and the connector detector 214 may find all the strokes that belong to a connector. To do so, an optimal search may be performed in time order to detect any containers. Then an efficient search may be performed to detect containers and connectors. Finally, content detection may be performed for each detected container.

At step 306, shape recognition may be performed to recognize containers and connectors. After all of the strokes have been grouped for each container and each connector, the shape recognition engine 206, in one embodiment, may be used to recognize closed containers and unclosed connectors in a drawing such as diagram or chart. When recognized, the type, location, orientation and size of the shape can be provided. Advantageously, the order of stroke input and the number of strokes do not affect the recognition. When shape recognition has been performed to recognize the closed containers and unclosed connectors, the drawing may be generated at step 308.

Figure 4:
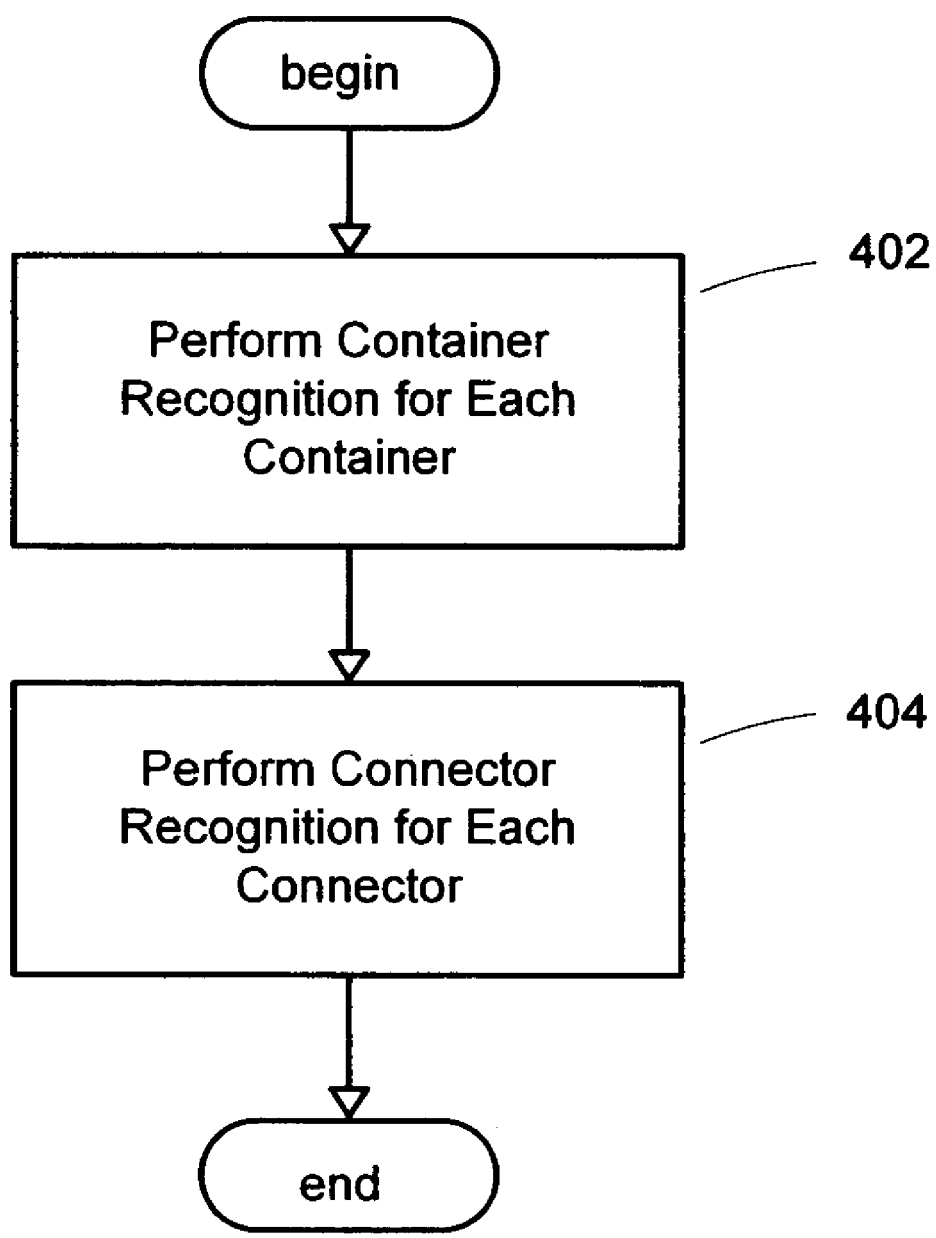
FIG. 4 is a flowchart generally representing one embodiment of the steps undertaken for shape recognition of containers and connectors, in accordance with an aspect of the present invention.

FIG. 4 presents a flowchart generally representing one embodiment of the steps undertaken for shape recognition of containers and connectors indicated at step 306. Container recognition may be performed at step 402 for each container to identify the closed shapes, including circles, triangles, quadrilaterals, pentagons, hexagons, and so forth. Moreover, specific types of shapes may be recognized such as distinguishing a circle from an ellipse, or distinguishing an isosceles triangle from an equilateral or right-angled triangle. As another example, several types of quadrilaterals may be recognized, including a trapezoid, a parallelogram, a diamond, a rectangle, and a square.

In one embodiment, the container recognizer 208, for example, may employ a decision tree that may combine both global statistical features and rule-based descriptions of specific shapes. In this embodiment, the global statistical features may be robust to local variations such as over-tracing, and rule-based descriptions may provide more detailed information of shapes. For instance, there may be a rule-based description for an isosceles triangle that may include a description of a triangle with two equal-length edges.

At step 404, connector recognition may be performed for each connector to identify the shape of the unclosed connectors, including skeletons, arrowheads and so forth. In one embodiment, polylines may be used to approximate a skeleton. In this embodiment, the connector recognizer 210, for example, may handle continuation strokes of the skeleton, overlapping strokes of the skeleton and over-tracing strokes of the skeleton. After a skeleton of a connector may be recognized, an arrowhead at one or both ends of the skeleton may be recognized. The connector recognizer 210 may invoke the skeleton recognizer 224 and/or the arrowhead recognizer 226 for identifying a skeleton and an arrowhead of a connector, respectively.

Figure 5:
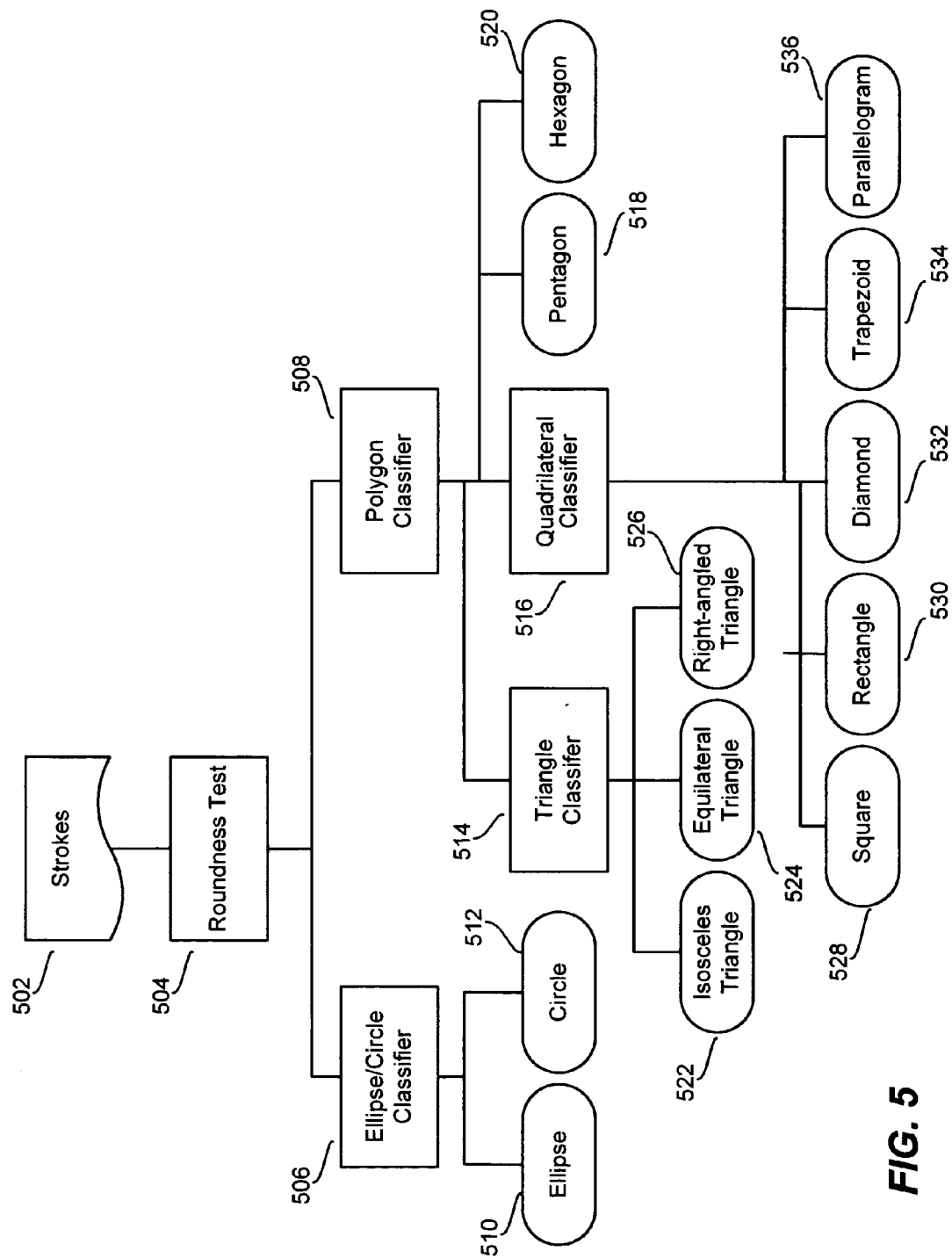
FIG. 5 is an exemplary illustration generally representing a decision tree that may combine both global statistical features and rule-based descriptions of specific shapes for use in performing shape recognition, in accordance with an aspect of the present invention.

FIG. 5 presents an illustration generally representing a decision tree that may combine both global statistical features and rule-based descriptions of specific shapes for use in performing shape recognition. The strokes 502 grouped together that belong to a container may be input to a roundness test 504 to determine how likely the shape of the strokes may represent a circle or an ellipse. The roundness test 504 may then determine whether to apply the ellipse/circle classifier 506 or the polygon classifier 508 to identify the shape of the strokes 502. The ellipse/circle classifier 506 may determine whether the shape of the strokes may be an ellipse 510 or a circle 512. The polygon classifier 508 may determine whether the shape of the strokes may be a pentagon 518 or a hexagon 520, or whether to apply the triangle classifier 514 or the quadrilateral classifier 516 to identify the shape of the strokes 502. The triangle classifier 514 may determine whether the shape of the strokes may be a triangle and may also employ rule-based descriptions that may provide more detailed information for distinguishing whether the triangle may be an isosceles triangle 522, an equilateral triangle 524, or right-angled triangle 526. Similarly, the quadrilateral classifier may determine whether the shape of the strokes may be a quadrilateral and may also employ rule-based descriptions that may provide more detailed information for distinguishing whether the quadrilateral may be a square 528, a rectangle 530, a diamond 532, trapezoid 534, or a parallelogram 536.

Figure 6:
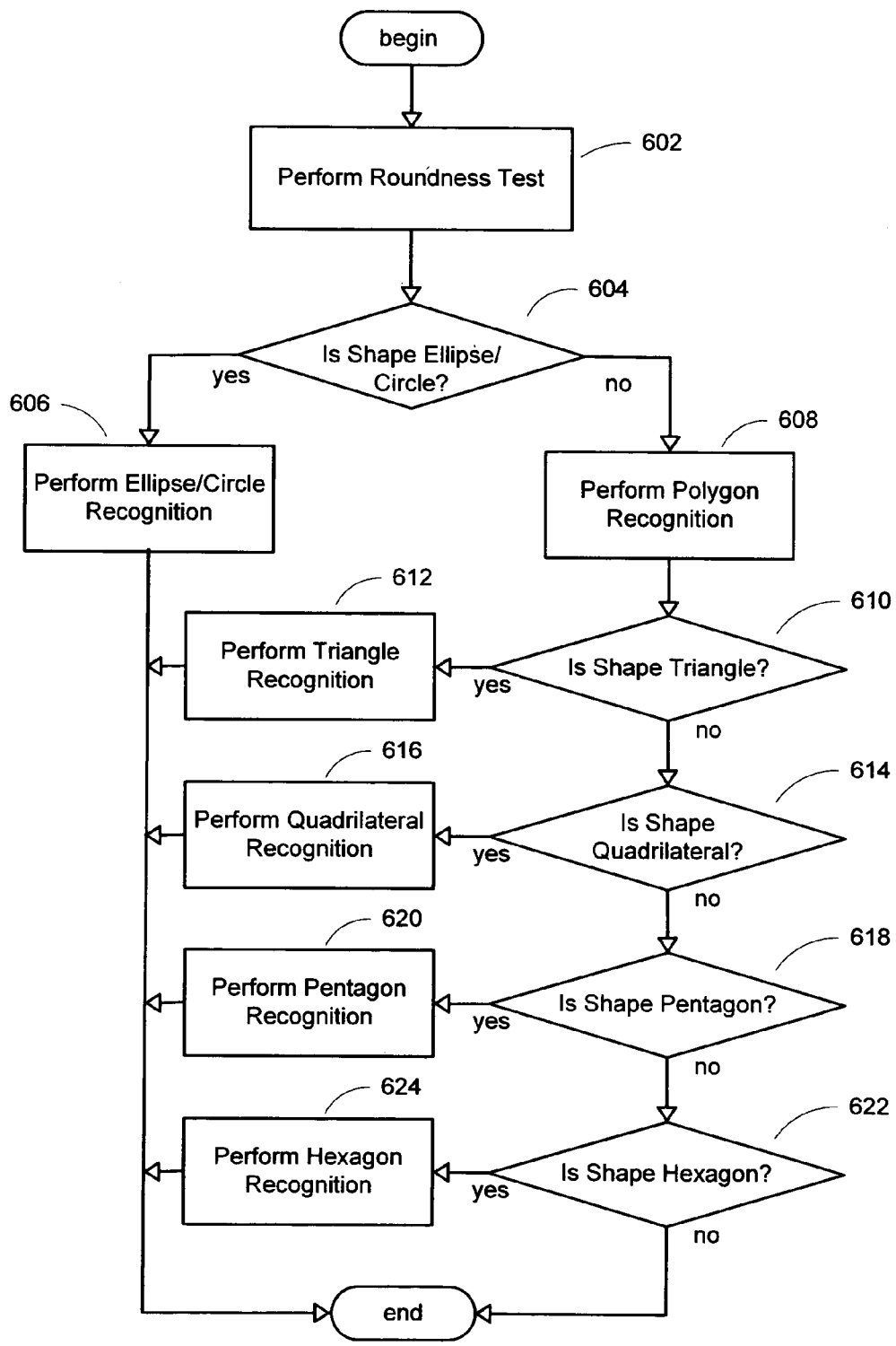
FIG. 6 is a flowchart generally representing an embodiment of the steps undertaken for recognizing the shape of a closed container, in accordance with an aspect of the present invention.

FIG. 6 presents a flowchart generally representing an embodiment of the steps undertaken for recognizing the shape of a closed container identified within ink input. At step 602, a roundness test may be performed to test how likely the shape is a circle or an ellipse. If the result of the roundness test indicates that the shape is likely to be a circle or an ellipse at step 604, then a process may be performed for recognition of a circle or an ellipse at step 606. If the result of the roundness test indicates that the shape is not likely to be a circle or an ellipse at step 604, then a process may be performed for recognition of a polygon at step 608. The process performed for recognition of a polygon at step 608 may indicate that the polygon may be a triangle or a quadrilateral. If the result of the process performed for recognition of a polygon indicates that the polygon may be a triangle at step 610, then a process may be performed for recognition of the specific type or subclass of triangle at step 612. For example, the specific type of triangle may be an isosceles triangle 522, an equilateral triangle 524, or right-angled triangle 526. However, if the result of the process performed for recognition of a polygon indicates that the polygon may be a quadrilateral at step 614, then a process may be performed for recognition of the specific type or subclass of quadrilateral at step 616. For instance, the specific type of quadrilateral may be a square 528, a rectangle 530, a diamond 532, trapezoid 534, or a parallelogram 536. Or the process performed for recognition of a polygon at step 608 may indicate that the polygon may be a pentagon 518 or a hexagon 520. If the result of the process performed for recognition of a polygon indicates that the polygon may be a pentagon at step 618, then a process may be performed for recognition of the pentagon at step 620. If the result of the process performed for recognition of a polygon indicates that the polygon may be a hexagon at step 622, then a process may be performed for recognition of the hexagon at step 624.

Figure 7:
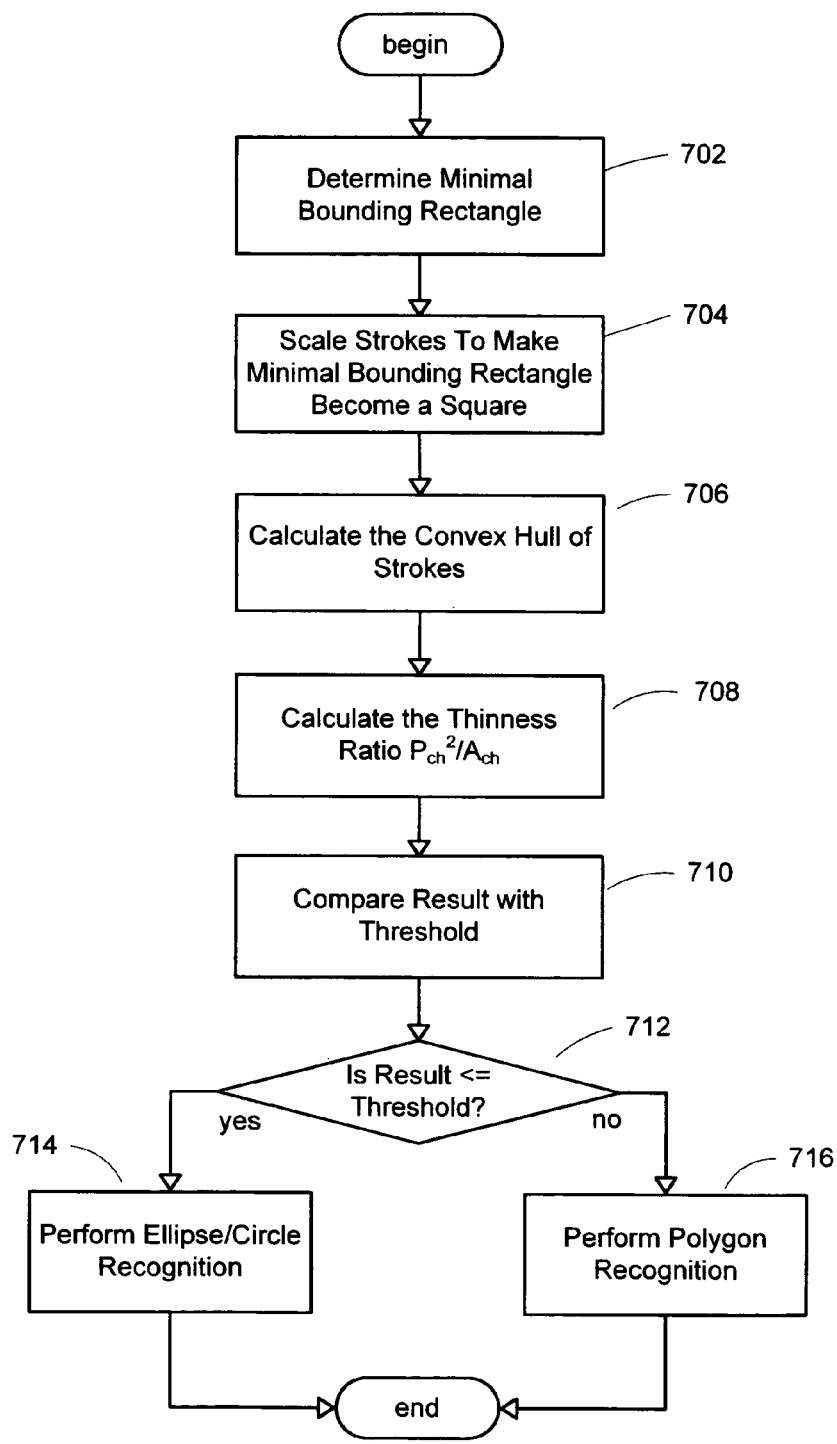
FIG. 7 is a flowchart generally representing an embodiment of the steps undertaken for performing a roundness test, in accordance with an aspect of the present invention.

FIG. 7 presents a flowchart generally representing an embodiment of the steps undertaken for performing a roundness test indicated at step 602. A threshold may be assigned for comparing the result of the roundness test to distinguish whether the shape of a closed container may be a circle/ellipse or a polygon. In one embodiment, a feature such as the thinness ratio $P_{ch}^2/A_{ch}$, where $P_{ch}$ and $A_{ch}$ represent the perimeter and the area of the shape's convex hull, respectively, may be used to test roundness. Before calculating the thinness ratio for a shape, the strokes of the shape may be scaled to make the minimal bounding rectangle become a square. Since a circle may have a minimal thinness ratio of $4*\pi$, both circles and ellipses may have a minimal thinness ratio of $4*\pi$, where $\pi$ (pi) is defined as the ratio of the circumference of a circle to its diameter. At step 702, the minimal bounding rectangle of the strokes may be determined and then the strokes of the shape may be scaled to make the minimal bounding rectangle become a square at step 704. Next, the convex hull of the strokes of the shape may be calculated at step 706 using Graham's Algorithm (which may be found in Computational Geometry in C (2nd Ed.) by Joseph O'Rourke, Cambridge University Press, 1998, ISBN:0-521-64976-5). Then the thinness ratio $P_{ch}^2/A_{ch}$ may be calculated at step 708. The result of calculating the thinness ratio $P_{ch}^2/A_{ch}$ may be compared with a threshold at step 710. In one embodiment, the threshold of $4*\pi*1.05$ may be assigned. If the thinness ratio $P_{ch}^2/A_{ch}$ is less than or equal to the threshold of $4*\pi*1.05$ at step 712, then the shape may be a circle or an ellipse, and a classifier may be used to further distinguish whether the shape of the closed container is either a circle or an ellipse at step 714. If the thinness ratio is greater than the threshold of $4*\pi*1.05$ at step 712, then the shape may be a polygon and a polygon classifier may be used at step 716 to further distinguish the type of polygon that the shape of the closed container may be. Those skilled in the art will appreciate that other thresholds and other features may be used to test roundness.

Figure 8:
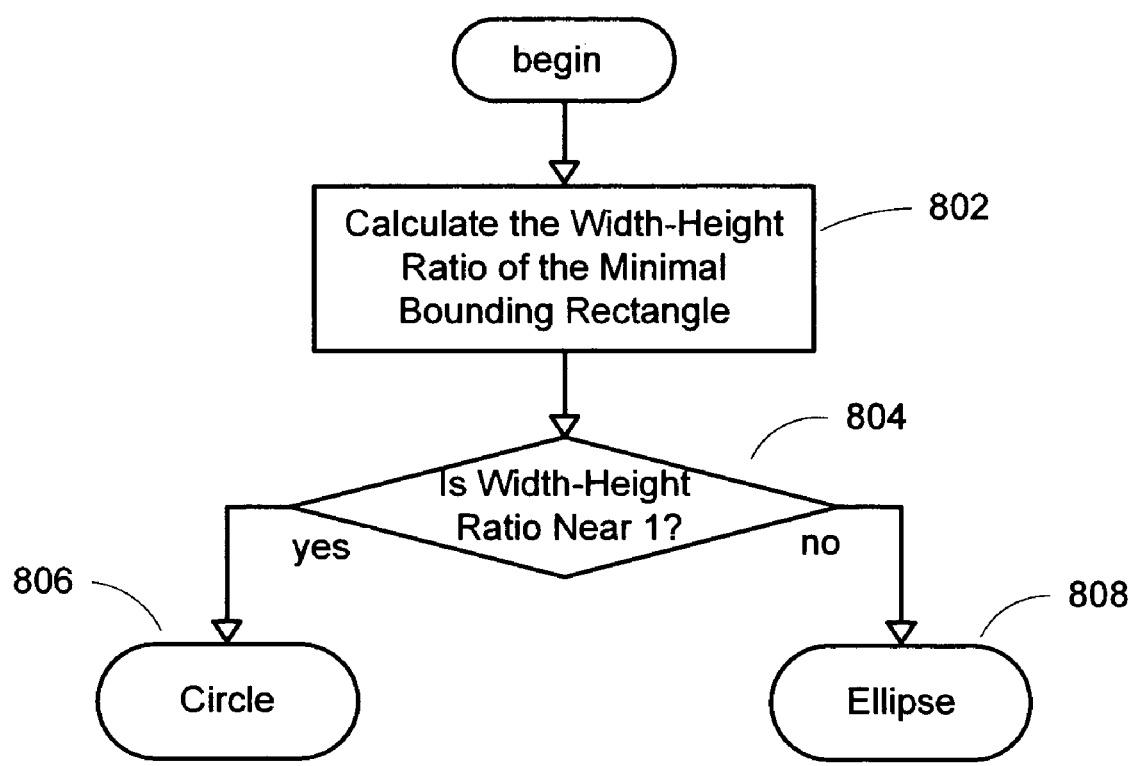
FIG. 8 is a flowchart generally representing the steps undertaken by a classifier to distinguish whether the shape of a closed container may be either a circle or an ellipse, in accordance with an aspect of the present invention.

FIG. 8 presents a flowchart generally representing the steps undertaken by a classifier to distinguish whether the shape of a closed container may be either a circle or an ellipse as indicated at step 714. In general, a feature such as the width-height ratio of the minimal bounding rectangle may be used in one embodiment to classify circles from ellipses. At step 802, the width-height ratio of the minimal bounding rectangle of the shape may be determined and then a determination may be made at step 804 whether the shape is either a circle 806 or an ellipse 808 according to a given threshold. In one embodiment, if the width-height ratio is near 1, such as within a range between 0.83 and 1.20, the shape may be classified as a circle; and an ellipse otherwise. Those skilled in the art will appreciate that other thresholds and other features may be used to classify circles from ellipses.

Figure 9:
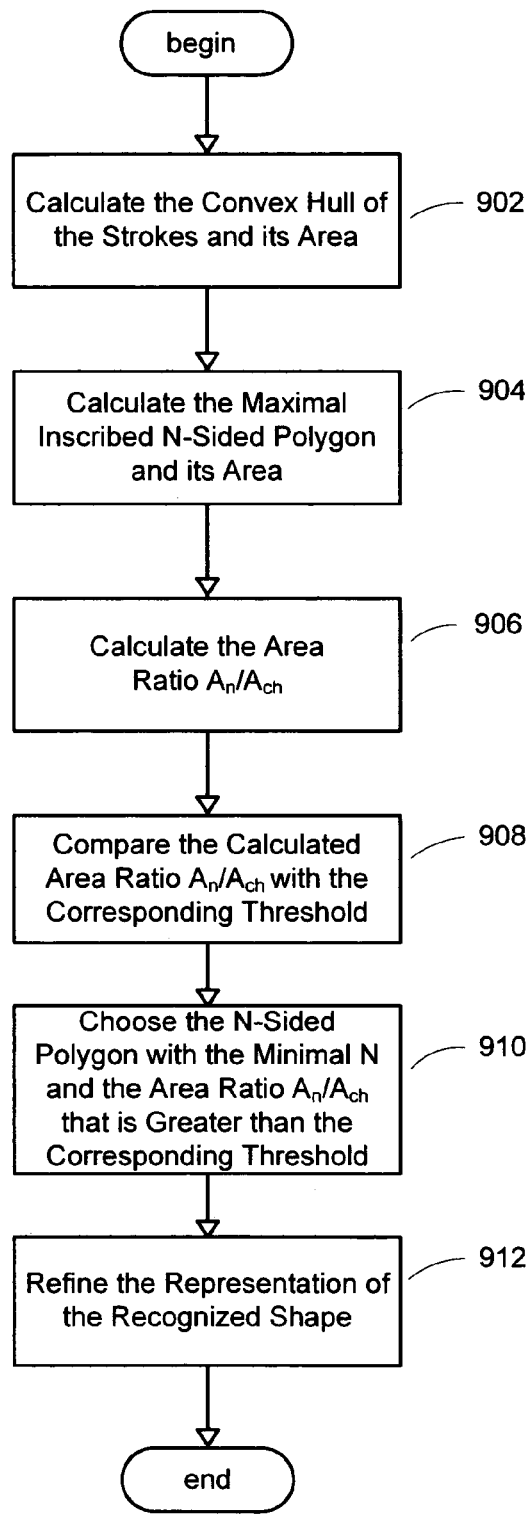
FIG. 9 is a flowchart generally representing one embodiment of the steps undertaken by a classifier to distinguish the type of polygon that a shape of a closed container may be, in accordance with an aspect of the present invention.
Figure 10:
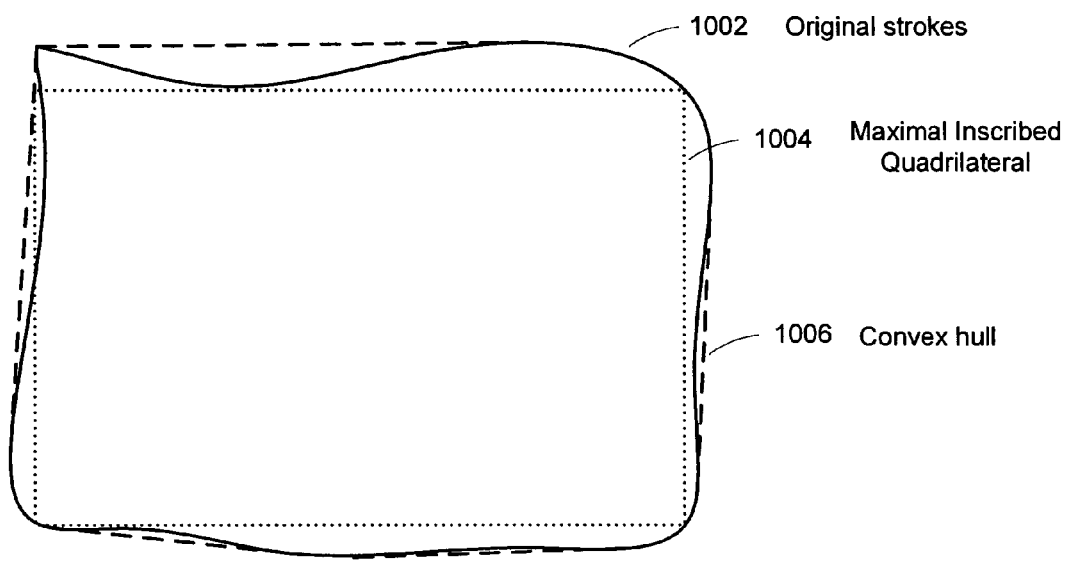
FIG. 10 is an exemplary illustration generally representing the strokes of a shape with a maximal inscribed polygon within a convex hull around the shape, in accordance with an aspect of the present invention.

FIG. 9 presents a flowchart generally representing the steps undertaken by a classifier to distinguish the type of polygon that a shape of a closed container may be. A polygon shape test may be performed for each desired type of n-sided polygon to determine the shape of the polygon. In one embodiment, the polygon shape test may be performed for a triangle, a quadrilateral, a pentagon, and a hexagon. One or more thresholds may be assigned for the polygon shape test for comparing the result of the polygon shape test performed for each desired type of n-sided polygon in order to distinguish which n-sided polygon the shape may be. In one embodiment, a feature such as the area ratio $A_n/A_{ch}$, where $A_n$ represents the area of a maximal inscribed n-sided polygon within the convex hull and $A_{ch}$ represents the area of a convex hull of the strokes, may be used to determine the shape of the polygon. In this embodiment, the convex hull of strokes may be calculated using Graham's Algorithm (which may be found in Computational Geometry in C (2nd Ed.) by Joseph O'Rourke, Cambridge University Press, 1998, ISBN:0-521-64976-5) and the area of the convex hull of strokes may be calculated at step 902. Then the largest inscribed n-sided polygon and its area $A_n$ may be calculated for each desired type of n-sided polygon at step 904. The largest inscribed n-sided polygon may be calculated using the algorithm proposed by Boyce found at: J. E. Boyce and D. P. Dobkin, Finding Extremal Polygons, SIAM Journal on Computing, 14(1):134-147, 1985. For example, the largest inscribed triangle, quadrilateral, pentagon, hexagon and their respective areas $A_3$, $A_4$, $A_5$ and $A_6$ may be calculated. At step 906, the area ratio $A_n/A_{ch}$ may be calculated for each desired type of n-sided polygon. The area ratio $A_n/A_{ch}$ for each desired type of n-sided polygon may be compared with the corresponding threshold at step 908. And finally, the n-sided polygon with the least edge count whose area ratio $A_n/A_{ch}$ is greater than its corresponding threshold may be chosen at step 910 as the type of polygon that represents the shape of the closed container. In one embodiment, the threshold for $A_3$, $A_4$, $A_5$ and $A_6$ may be 0.73, 0.84, 0.93 and 0.94, respectively. FIG. 10 illustrates an example of the strokes of a shape 1002 with a maximal inscribed quadrilateral 1004 within a convex hull 1006 around the shape 1002. In this illustration, the area ratio of the inscribed quadrilateral and the convex hull may be greater than the corresponding threshold and have the least edge count when compared with the area ratio of other n-sided polygons such as a pentagon or hexagon. Consequently, the shape may be classified as a quadrilateral.

Figure 11:
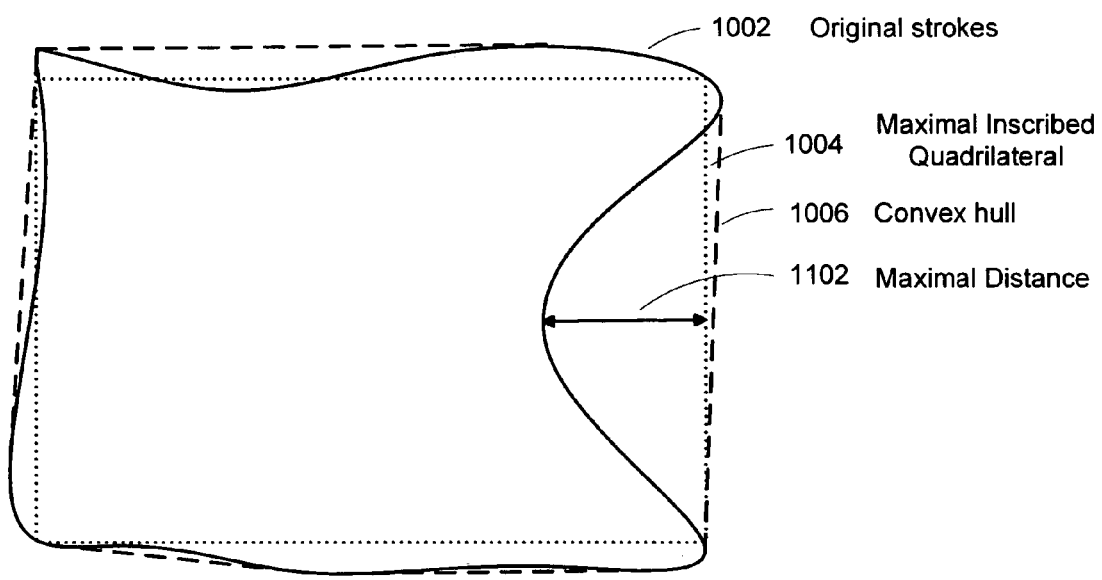
FIG. 11 is an exemplary illustration generally representing the maximal distance between the strokes of a shape and a maximal inscribed polygon within a convex hull around the shape, in accordance with an aspect of the present invention.

Since the convex hull is used to calculate the area ratio, in one embodiment the concave case may be tested to avoid false classification. The concave case may be tested by checking the maximal distance of points in the strokes and the edge of the recognized shape. For example, FIG. 11 illustrates a maximal distance 1102 between the points of the strokes of the hand-drawn shape 1002 and the edge of the recognized shape, the maximal inscribed quadrilateral 1004. The shape may not be classified as a quadrilateral if the maximal distance 1102 is larger than an empirical threshold.

Since the largest-area inscribed triangle or quadrilateral has been calculated, we can determine in one embodiment the sub-classes according to rule-based descriptions of specific types of shapes in performing shape recognition. For example, if the lengths of two edges of a triangle are almost the same, it may be further classified as isosceles triangle. As an example, if all three sides of a triangle are almost equal, then the triangle may be further classified as an equilateral triangle. As yet another example, if the sum of the squares of any two sides approximately equals the square of the third side, then the triangle may be further classified as a right-angled triangle.

Similarly, for a quadrilateral, if the lengths of all four sides are almost equal and each pair of adjacent sides is almost perpendicular, then the shape may be further classified as a square. If the lengths of all four sides are not almost equal and each pair of adjacent sides is almost perpendicular, the shape may be further classified as a rectangle. If each pair of opposite sides is almost parallel and any two adjacent sides are not almost perpendicular and the lengths of all four sides are almost equal, then the shape may be further classified as a diamond. If each pair of opposite sides is almost parallel and any two adjacent sides are not almost perpendicular and the lengths of all four sides are not almost equal, then the shape may be further classified as a parallelogram. If only one pair of opposite sides is almost parallel and any two adjacent sides are not almost perpendicular, then the shape may be further classified as a trapezoid.

Figure 12:
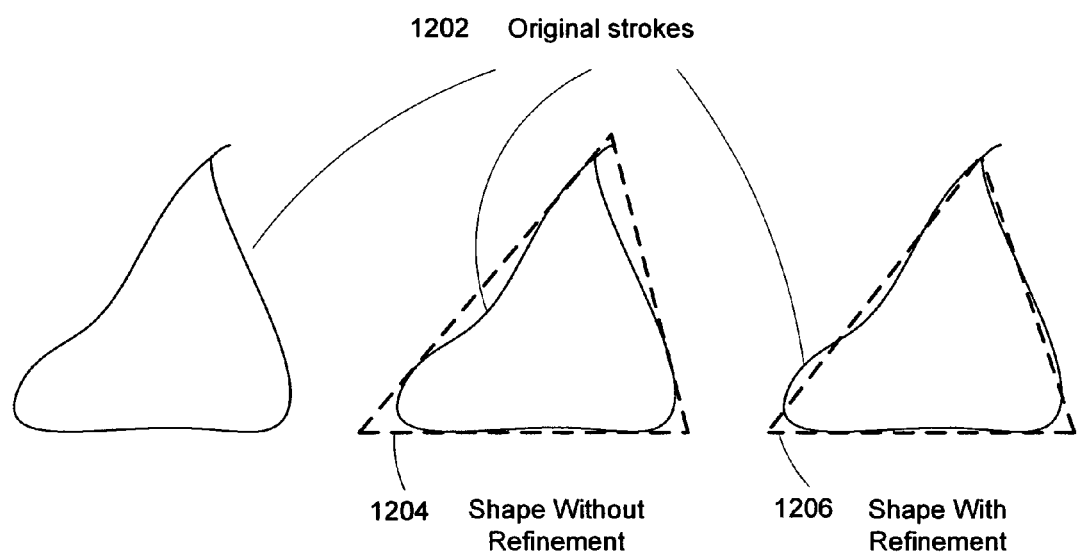
FIG. 12 is an exemplary illustration generally representing refinement of the edges of a polygon recognized from the strokes of a hand-drawn shape, in accordance with an aspect of the present invention.

After the shape of the polygon has been classified, the edges of the polygon shapes may be refined for better representation at step 912. In specific, the distance between each point of the input strokes and the edges of the recognized polygon may be computed to determine to which edge of the recognized polygon that each point of the input strokes belongs. Then, the position and orientation of each edge of the recognized polygon may be recomputed according to the robust regression results of the corresponding points of the input strokes. As a result of refinement, the edges of the shape 1204 recognized from the strokes of the hand-drawn shape 1202 may be better represented as illustrated in FIG. 12 by the shape with refinement 1206.

Figure 13:
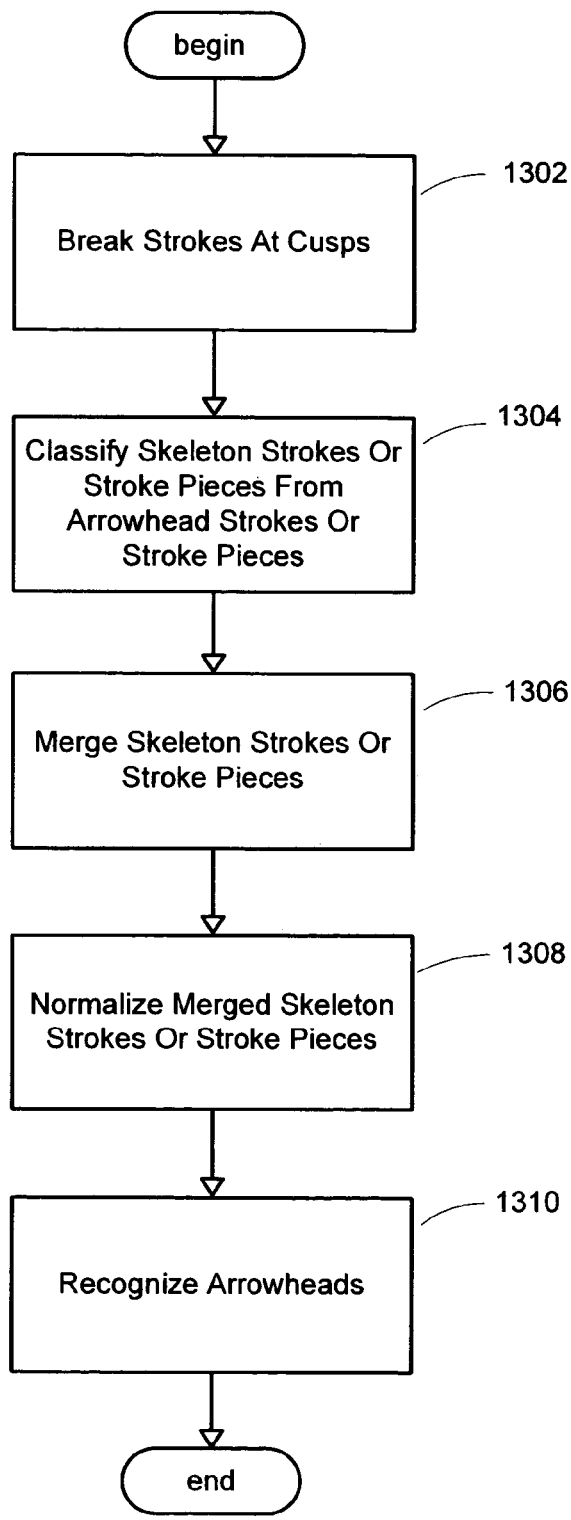
FIG. 13 is a flowchart generally representing the steps undertaken for recognizing the shape of a connector, in accordance with an aspect of the present invention.
Figure 14:
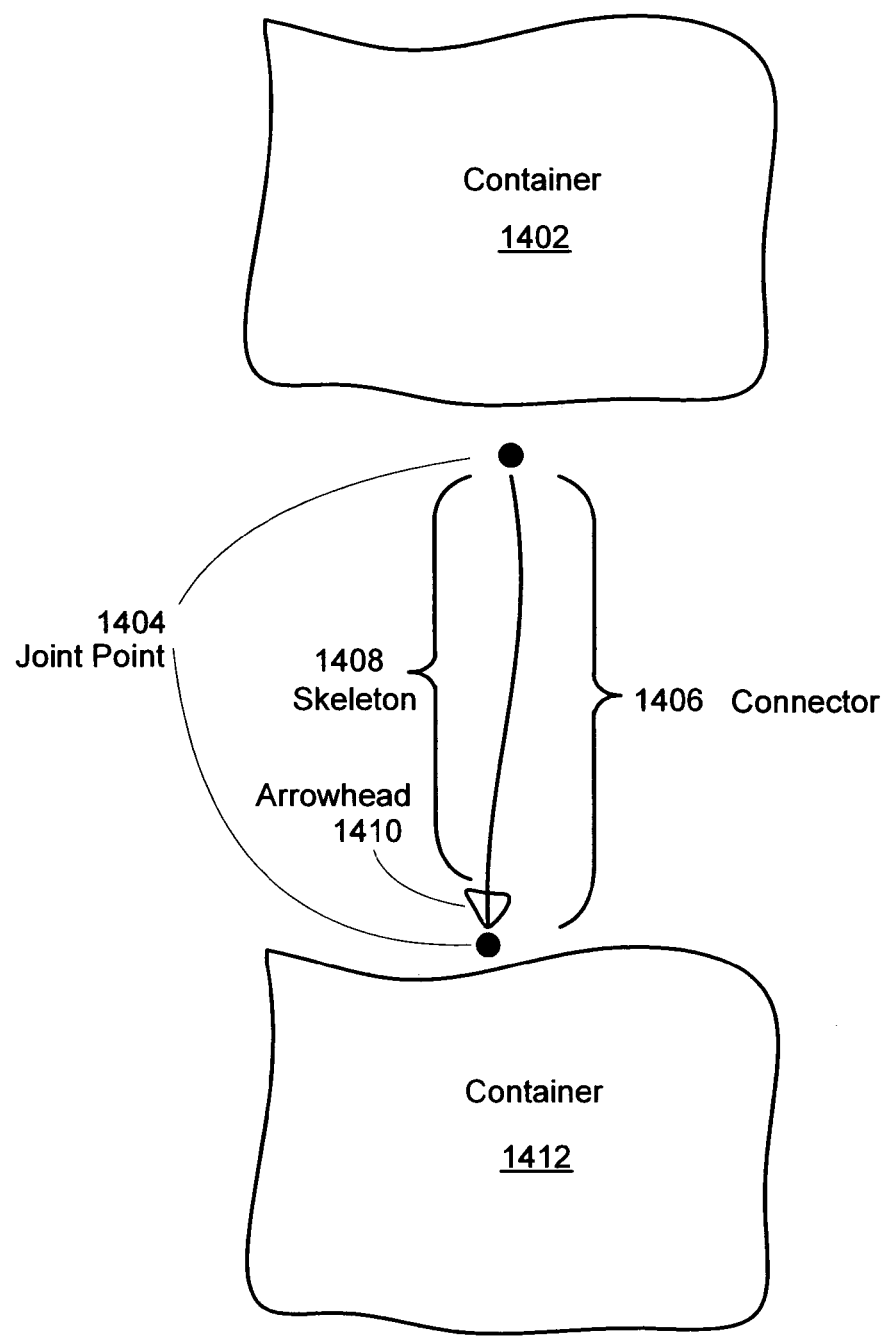
FIG. 14 is an exemplary illustration generally representing a connector between two containers, in accordance with an aspect of the present invention.

FIG. 13 presents a flowchart generally representing the steps undertaken for recognizing the shape of a connector identified within ink input. The input for recognizing the shape of a connector may include the strokes and joint points with containers, as illustrated in FIG. 14, that may have been previously identified by the chart detector. A joint point as defined herein means a point of the connector's strokes that has the minimal distance to a container. For instance as illustrated in FIG. 14, there may be a joint point 1404 at each end of a connector 1406 where the joint point may attach to one of the containers 1402 and 1412. In general, each connector may include a line or curve between either a joint point or arrowhead and another joint point or arrowhead, defined herein as a skeleton 1408, and each connector may include an arrowhead 1410 at either or both ends of the skeleton.

In drawing a connector, some users may draw the skeleton of a connector using a back and forth motion with overlapping strokes. Other users may similarly draw an arrowhead of a connector using a back and forth motion. Still, other users may draw the skeleton and the arrowhead of a connector in one single stroke. Because users may draw the skeleton and the arrowhead with one single stroke, different parts of the strokes may be parsed and recognized separately. Accordingly, at step 1302 in FIG. 13, the strokes may be broken into pieces at points of the high curvature, herein defined as cusps. By parsing one stroke as a polyline, each non-ending point of the stroke may form an intersection of two line segments. In one embodiment, the angle of two line segments at each non-ending point of the stroke may be computed and the strokes may be broken at points where the corresponding angle is less than a threshold such as 80 degrees. To avoid breaking the stroke into too many meaningless pieces at local fluctuations, the strokes may first be smoothed in one embodiment by applying Sklansky's polyline approximation (which may be found in Sklansky J. and Gonzalez V., Fast Polygonal Approximation of Digitized Curves, Pattern Recognition, Vol.12, pp.327-331, 1980) to simplify and smooth the strokes.

At step 1304, the strokes or stroke pieces may be classified as either skeleton strokes or arrowhead strokes so that the skeleton strokes of the connector and the arrowhead strokes of the connector may be separately recognized.

A stroke or stroke piece may be considered to be an arrowhead stroke if its size is less than an empirical threshold and its distance to the joint point is small. In one embodiment such an empirical threshold may be 12.8 millimeters and the distance to the joint point may be less than 8.5 millimeters. Any strokes not considered arrowhead strokes may be classified as a skeleton stroke. To avoid the misclassification of all the strokes of a short arrow as arrowhead strokes, the stroke or stroke pieces that have minimal distances to the center of the convex hull of the connector may be identified as a skeleton stroke or stroke pieces.

Figure 15:
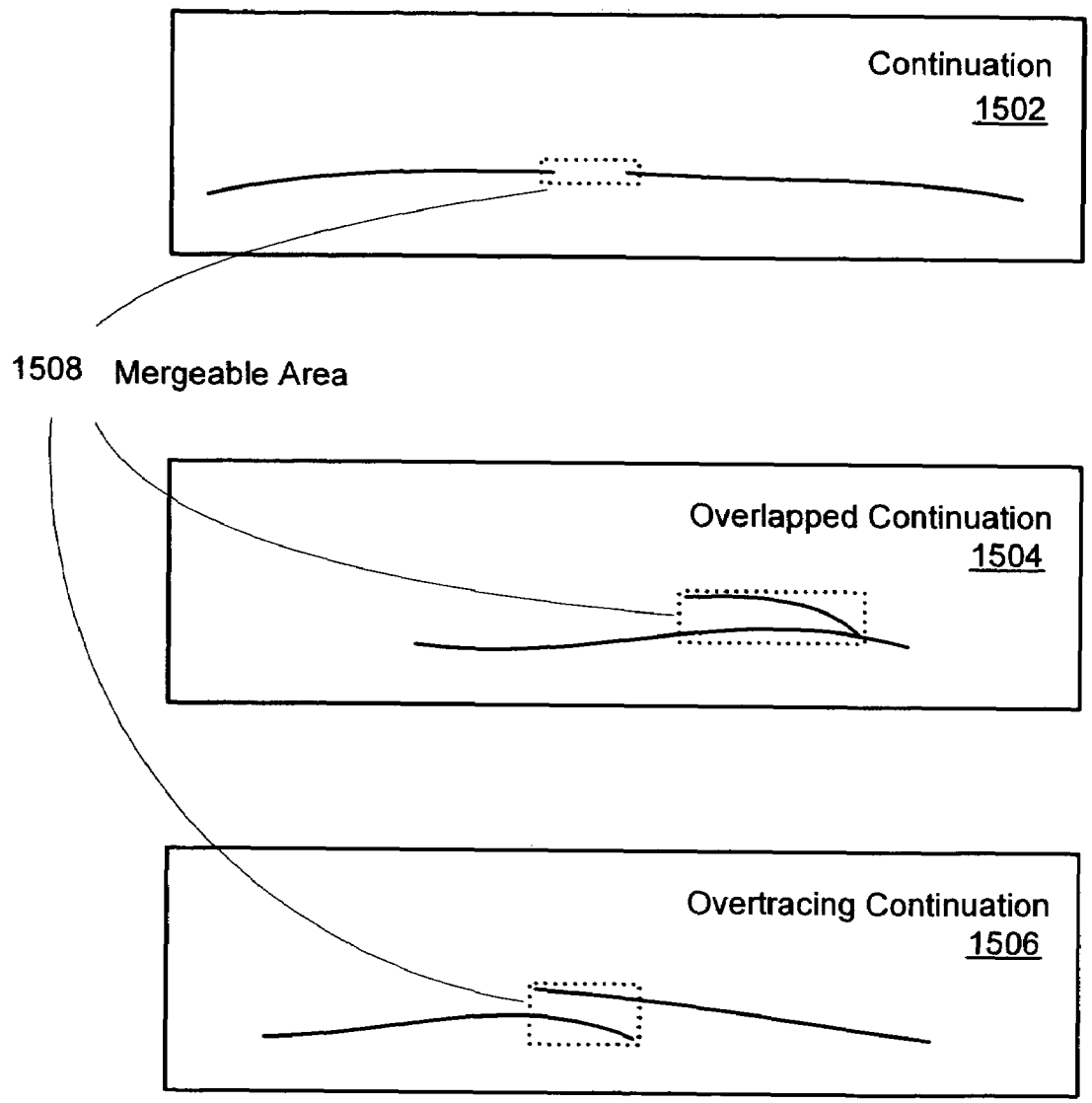
FIG. 15 is an exemplary illustration generally representing examples of merging skeleton strokes or stroke pieces, in accordance with an aspect of the present invention.

At step 1306, the skeleton strokes or stroke pieces may be merged. The skeleton strokes or pieces to be merged may occur with one stroke or piece as separated from another stroke or piece, with one stroke or piece as overlapping another stroke or piece, or with one stroke or piece as overtracing another stroke or piece. These general cases are illustrated in FIG. 15. For each of these, a mergable area 1508 may be defined by constructing a quadrilateral that may contain the ends of the separated strokes or pieces of strokes that may form a continuation 1502 when merged, or may contain the overlapping area of the overlapping strokes or pieces of strokes that may form an overlapped continuation 1504 when merged, or may contain the overtracing area of the overtraced strokes or pieces of strokes that may form an overtraced continuation 1506 when merged. For merging skeleton strokes or stroke pieces, a connection score may be defined for each pair of strokes or pieces of strokes. In one embodiment, the connection score may be defined as:

$$S = w_1 \frac{1}{d_m} + w_2 \frac{l_m}{l},$$

for the overtraced and the overlapped continuation cases, and $$S = w_1 \frac{1}{d_m}$$

for the continuation case, where l is the total length of the two strokes or pieces of strokes, $w_1$, $w_2$ are weights, and $d_m$, $l_m$ are the width and length of the defined mergable area, respectively. In general, this connection score may be larger when two strokes or pieces of strokes lie near and smaller when the strokes or pieces of strokes lie farther apart. For all the skeleton strokes or pieces of skeleton strokes, a recursive merging process is performed by merging the two skeleton strokes or pieces of skeleton strokes with the highest connection score until there is no mergable stroke pair remaining.

At step 1308, each merged skeleton stroke or stroke piece may be normalized to eliminate local fluctuations. In one embodiment, Sklansky's polyline approximation (which may be found in Sklansky J. and Gonzalez V., Fast Polygonal Approximation of Digitized Curves, Pattern Recognition, Vol.12, pp.327-331, 1980) may be applied for each merged skeleton stroke or stroke piece for normalization. Once the last merged skeleton stroke has been normalized, the final skeleton of the connector may be completely generated.

At step 1310, the arrowhead strokes or pieces of strokes may be recognized. In one embodiment, the convex hull of the arrowhead strokes or pieces of strokes may be tested to see if the shape is likely to be a triangle. A feature such as the area ratio $A_n/A_{ch}$, where $A_n$ represents the area of a maximal inscribed triangle and $A_{ch}$ represents the area of a convex hull of the strokes, may be used to determine the shape of the triangle. In this embodiment, the convex hull of strokes may be calculated using Graham's Algorithm (which may be found in Computational Geometry in C (2nd Ed.) by Joseph O'Rourke, Cambridge University Press, 1998, ISBN: 0-521-64976-5) and then the area of the convex hull of strokes $A_{ch}$ may be calculated. The largest inscribed triangle may be calculated using the algorithm proposed by Boyce (which may be found in J. E. Boyce and D. P. Dobkin, Finding Extremal Polygons, SIAM Journal on Computing, 14(1):134-147, 1985) and then its area $A_n$ may be calculated. Next, the area ratio $A_n/A_{ch}$ may be calculated and may be compared with a threshold, such as within a range close to 1, to determine that the shape of the arrowhead strokes or pieces of strokes may be a triangle.

In one embodiment, the concave case may be tested by checking the maximal distance of points in the strokes and the edge of the recognized triangle to avoid false classification. Then, the edges of the triangle may be refined for better representation. First, the distance between each point of the arrowhead strokes or stroke pieces and the edges of the triangle may be computed to determine to which edge of the recognized triangle that each point of the strokes or stroke pieces belongs. Then, the position and orientation of each edge of the recognized triangle may be recomputed according to the robust regression results of the corresponding points of the arrowhead strokes or stroke pieces. The complete connector may thus be generated by combining the final skeleton and any arrowheads recognized.

After all the containers and connectors have been generated by the described system and method, the hand-drawn objects within the ink input may be completely recognized and generated. By using the present invention, a user may draw diagrams and flow charts freely and without restrictions on the hand-drawn input. One shape may have many strokes and the input order of strokes may be arbitrary so that the system and method may accept any ink as input. Moreover, the strokes could be over-traced or overlapped. For either case, the system and method may automatically detect the correct shapes.

As can be seen from the foregoing detailed description, the present invention provides a system and method for shape recognition of hand-drawn objects. Advantageously, the system and method are insensitive to stroke input order and the number of strokes that may form a hand-drawn shape. Furthermore, the system and method provided are flexible and extensible. As is now understood, the present invention may be used to recognize any closed containers and unclosed connectors in a drawing including a diagram and chart. When recognized, the type, location, orientation and size of the shape can be provided. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for recognizing a hand-drawn shape, comprising:
    a shape recognizer for receiving from a user, a hand-drawn ink input representing a diagram, flow chart, or both;
    a container recognizer operably coupled to the shape recognizer for performing container recognition that identifies a plurality of closed containers within ink input; and
    a connector recognizer operably coupled to the shape recognizer for identifying a connector within ink input that connects the plurality of closed containers, wherein the identifying of the connector includes identifying a skeleton stroke, an arrowhead stroke, or both, by breaking the connector into pieces at cusps, which are points of high curvature within the connector; and
    a grouper operably coupled to the shape recognizer for grouping the plurality of containers with the connector by automatically adjusting one or more properties of at least one of the plurality of containers, the connector, or both, such that the plurality of containers and the connector are considered joined, thus allowing the user to create the diagram, flow chart, or both without concern for a stroke input order, a number of strokes used, or both.

2. The system of claim 1 further comprising an ink parser operably coupled to the shape recognizer for sending ink input to the shape recognizer.

3. The system of claim 2 further comprising a chart detector operably coupled to the ink parser for grouping drawing strokes.

4. The system of claim 3 wherein the chart detector comprises a container detector operably coupled to the chart detector.

5. The system of claim 3 wherein the chart detector comprises a connector detector operably coupled to the chart detector.

6. The system of claim 1 wherein the container recognizer comprises an ellipse/circle classifier operably coupled to the container recognizer.

7. The system of claim 1 wherein the container recognizer comprises a polygon classifier operably coupled to the container recognizer.

8. The system of claim 1 wherein the container recognizer comprises a triangle classifier operably coupled to the container recognizer.

9. The system of claim 1 wherein the container recognizer comprises a quadrilateral classifier operably coupled to the container recognizer.

10. The system of claim 1 wherein the connector recognizer comprises a skeleton recognizer operably coupled to the connector recognizer.

11. The system of claim 1 wherein the connector recognizer comprises an arrowhead recognizer operably coupled to the connector recognizer.

12. The system of claim 1 wherein at least one of the plurality of closed containers comprises a circle.

13. The system of claim 1 wherein at least one of the plurality of closed containers comprises an ellipse.

14. The system of claim 1 wherein at least one of the plurality of closed containers comprises a triangle.

15. The system of claim 1 wherein at least one of the plurality of closed containers comprises a quadrilateral.

16. The system of claim 1 wherein the connector comprises an arrow.

17. The system of claim 1 wherein the connector comprises a line.

18. The system of claim 1 wherein the connector comprises a curve.

19. The system of claim 1 wherein at least one of the plurality of containers comprises text.

20. A computer-readable medium having computer-executable components comprising the system of claim 1.

21. A method for recognizing a hand-drawn shape, comprising:
receiving from a user, a hand-drawn ink input representing a diagram, flow chart, or both;
performing container recognition for identifying a plurality of containers within the ink input;
performing connector recognition for identifying at least one connector within the ink input for connecting the plurality of containers, wherein the identifying of the connector includes identifying a skeleton stroke, an arrowhead stroke, or both, by breaking the connector into pieces at cusps, which are points of high curvature within the connector; and
grouping the plurality of containers with the connector by automatically adjusting one or more properties of at least one of the plurality of containers, the connector, or both, such that the plurality of containers and the connector are considered joined, thus allowing the user to create the diagram, flow chart, or both without concern for a stroke input order, a number of strokes used, or both.

22. The method of claim 21 further comprising parsing the ink input to differentiate writing from drawing within the ink input.

23. The method of claim 21 further comprising performing chart detection to identify strokes of a diagram within ink input.

24. The method of claim 21 further comprising generating a drawing with each of the plurality of containers and the connector recognized within the ink input.

25. The method of claim 21 wherein performing container recognition comprises performing a roundness test.

26. The method of claim 21 wherein performing container recognition comprises performing ellipse/circle recognition.

27. The method of claim 26 wherein performing ellipse/circle recognition comprises determining a minimum bounding rectangle around strokes of the container.

28. The method of claim 27 further comprising scaling the strokes to make the minimum bounding rectangle become a square.

29. The method of claim 21 wherein performing container recognition comprises performing polygon recognition.

30. The method of claim 29 wherein performing polygon recognition comprises determining a maximal inscribed polygon within a convex hull around strokes of the container.

31. The method of claim 29 wherein performing polygon recognition comprises calculating an area ratio $A_n/A_{ch}$ where $A_n$ represents an area of a maximal inscribed n-sided polygon within a convex hull around the strokes of the container and $A_{ch}$ represents an area of the convex hull around the strokes of the container.

32. The method of claim 29 wherein performing polygon recognition comprises choosing an n-sided polygon with a least number of edges and with an area ratio $A_n/A_{ch}$ greater than a threshold.

33. The method of claim 29 wherein performing polygon recognition comprises refining edges of a recognized polygon.

34. The method of claim 21 wherein performing container recognition comprises performing triangle recognition.

35. The method of claim 21 wherein performing container recognition comprises performing quadrilateral recognition.

36. The method of claim 21 wherein performing container recognition comprises calculating a convex hull of strokes belonging to a container.

37. The method of claim 21 wherein performing container recognition comprises calculating a thinness ratio $P_{ch}^2/A_{ch}$, where $P_{ch}$ and $A_{ch}$ represent a perimeter and an area of a convex hull around strokes of the container.

38. The method of claim 21 wherein the properties are chosen from a type, location, orientation, shape, or size of the container, connector, or both.

39. The method of claim 21 wherein a cusp is identified by determining an angle for a non-ending point, which is a two line segment within the connector.

40. The method of claim 39 wherein the connector is broken into pieces when the angle for the non-ending point is less than some predefined threshold.

41. The method of claim 21 wherein the connector is smoothed prior to breaking the connector into pieces in order to avoid breaking the connector into too many meaningless pieces.

42. The method of claim 21 wherein the breaking of the connector into pieces is used to identify a skeleton stroke of the connector from an arrowhead stroke of the connector.

43. The method of claim 42 wherein the arrowhead stroke of the connector is identified by determining that a broken piece of the connector is a size less than a predetermined empirical threshold.

44. The method of claim 43 wherein the arrowhead stroke of the connector is also identified by determining that a distance to a point where the arrowhead stroke was broken from the skeleton of the connector is less than some predetermined threshold.

45. A method for recognizing a hand-drawn shape, comprising:

receiving a hand-drawn ink input;

performing container recognition for each container within the ink input, the container recognition comprising at least one of performing ellipse/circle recognition or performing polygon recognition, wherein the performing ellipse/circle recognition comprises determining a minimum bounding rectangle around strokes of the container and scaling the strokes to make the minimum bounding rectangle become a square, and wherein the performing polygon recognition comprises determining a maximal inscribed polygon within a convex hull around strokes of the container; and performing connector recognition for each connector within the ink input.

\* \* \* \* \*

UNITED STATES PATENT AND TRADEMARK OFFICE
CERTIFICATE OF CORRECTION

PATENT NO. : 7,324,691 B2  Page 1 of 1
APPLICATION NO. : 10/850718
DATED : January 29, 2008
INVENTOR(S) : Yantao Li et al.

It is certified that error appears in the above-identified patent and that said Letters Patent is hereby corrected as shown below:

In column 16, line 24, in Claim 31, delete "$A_n/A_{ch}$" and insert -- $A_n/A_{ch}$, --, therefor.

Signed and Sealed this
Twenty-second Day of February, 2011

David J. Kappos
*Director of the United States Patent and Trademark Office*